(12) United States Patent
Daniels

(10) Patent No.: US 6,373,500 B1
(45) Date of Patent: Apr. 16, 2002

(54) METHOD FOR IMPLEMENTING PICTURE-IN-PICTURE FUNCTION FOR MULTIPLE COMPUTERS

(75) Inventor: Ted Daniels, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/377,069

(22) Filed: Aug. 19, 1999

(51) Int. Cl.7 .................................................. G09G 5/14
(52) U.S. Cl. ........................ 345/632; 345/748; 345/753; 348/552; 348/565
(58) Field of Search ................................. 345/115, 114, 345/435, 302, 433, 421, 1, 3, 632, 633, 634, 717, 718, 723, 748, 753, 754, 1.1; 348/565, 564, 563, 553, 552

(56) References Cited

U.S. PATENT DOCUMENTS

| | | | | |
|---|---|---|---|---|
| 5,111,296 A | * | 5/1992 | Duffield et al. ............. | 348/565 |
| 5,113,259 A | * | 5/1992 | Romesburg et al. ........ | 348/565 |
| 5,125,077 A | | 6/1992 | Hall ............................ | 395/275 |
| 5,172,103 A | * | 12/1992 | Kita ............................ | 345/127 |
| 5,285,284 A | | 2/1994 | Takashima et al. ......... | 348/731 |
| 5,453,796 A | | 9/1995 | Duffield et al. ............. | 348/565 |
| 5,506,628 A | | 4/1996 | Chun ........................... | 348/565 |
| 5,590,315 A | | 12/1996 | Hess et al. ................... | 395/500 |
| 5,594,467 A | * | 1/1997 | Marlton et al. .............. | 345/115 |
| 5,802,281 A | * | 9/1998 | Clapp et al. ................. | 709/228 |
| 5,841,483 A | | 11/1998 | Shafer ......................... | 348/565 |
| 5,900,916 A | * | 5/1999 | Pauley ......................... | 725/59 |
| 6,011,592 A | * | 1/2000 | Vaughan et al. ............ | 348/552 |
| 6,073,192 A | * | 6/2000 | Clapp et al. ................. | 710/65 |
| 6,144,362 A | * | 11/2000 | Kawai ......................... | 345/115 |
| 6,204,887 B1 | * | 3/2001 | Hiroi ........................... | 348/565 |
| 6,233,389 B1 | * | 5/2001 | Barton et al. ................ | 386/46 |

* cited by examiner

Primary Examiner—Michael Razavi
Assistant Examiner—Thu-Thao Havan
(74) Attorney, Agent, or Firm—Perkins Coie LLP

(57) ABSTRACT

An apparatus simultaneously displays the output of two or more computers on a single monitor in a manner similar to the manner in which television sets provide picture-in-picture (PIP) viewing. In one embodiment, computer video is converted to a format such as NTSC so that existing television set PIP circuits may be employed with little or no modification. In another embodiment, the PIP circuit accepts computer video inputs. In yet another embodiment, the apparatus utilizes a processor to control the content of the main display area and PIP window using cursor position. The apparatus also supplies input device signals, such as mouse and keyboard signals, to the computer corresponding to the main screen area and transmits dummy keyboard and mouse signals to other computers attached to the system.

34 Claims, 7 Drawing Sheets

METHOD FOR IMPLEMENTING PICTURE-IN-PICTURE FUNCTION FOR MULTIPLE COMPUTERS

BACKGROUND OF THE INVENTION

1. Field of the Invention

The present invention relates generally to the field of computer displays and more particularly to a device that allows two or more computers to be used with one monitor.

2. Description of the Related Art

It is sometimes necessary for a computer user to use two or more different computers such as two PCs. Such a situation may arise, for example, when a user must perform some tasks on one computer attached to a network and other tasks on another computer not attached to the network. In such a situation, it is cumbersome for a user to have two monitors, two keyboards and two mice on his desktop.

The prior art has attempted to deal with this problem by providing switches that will allow two computer systems to share one monitor while the prior art switches are helpful to some extent, there are still problems associated with these switches. First, two keyboards and two mice are still required. Thus, a desktop may still be cluttered even with the elimination of one display.

Second, it is sometimes helpful or necessary to be able to view information from one computer system while working on the other computer system. The prior art switches do not provide this function; they can only select one computer or the other for display at any one time.

What is needed is a device that can simultaneously display the output of at least two computers on a single screen and a device that will allow at least two computers to share a mouse and keyboard as well as a monitor.

SUMMARY OF THE INVENTION

The invention overcomes to a great extent the aforementioned problems by providing a switchbox that can be used to simultaneously display the output of two computers on a single monitor in a manner similar to the manner in which television sets provide picture-in-picture (PIP) viewing. In one embodiment, computer video is converted to a format such as NTSC so that existing television set PIP receivers may be employed with little or no modification. The switchbox also sends keyboard and mouse signals to the computer corresponding to the information displayed in the main screen area and dummy keyboard and mouse signals to the computer corresponding to the PIP window.

In another embodiment, the switchbox utilizes a processor to control the content of the main display area and PIP window using cursor position.

BRIEF DESCRIPTION OF THE DRAWING

The foregoing and other advantages and features of the invention will become more apparent from the detailed description of the preferred embodiments of the invention given below with reference to the accompanying drawing in which.

DETAILED DESCRIPTION OF THE PREFERRED EMBODIMENTS

The present invention will be illustrated through a description of various embodiments of a switchbox for connecting two computers to one monitor. Numerous specific details, such as how displays are switched between the main display and the PIP window, the locations of various switches, etc., are set forth in order to provide a thorough understanding of the present invention. It will be obvious, however, to one skilled in the art that the present invention is capable of many different embodiments and that the present invention may be practiced without the specific details set forth herein. Accordingly, the drawings and description herein are to be regarded as illustrative in nature and not as restrictive.

Figure 1:
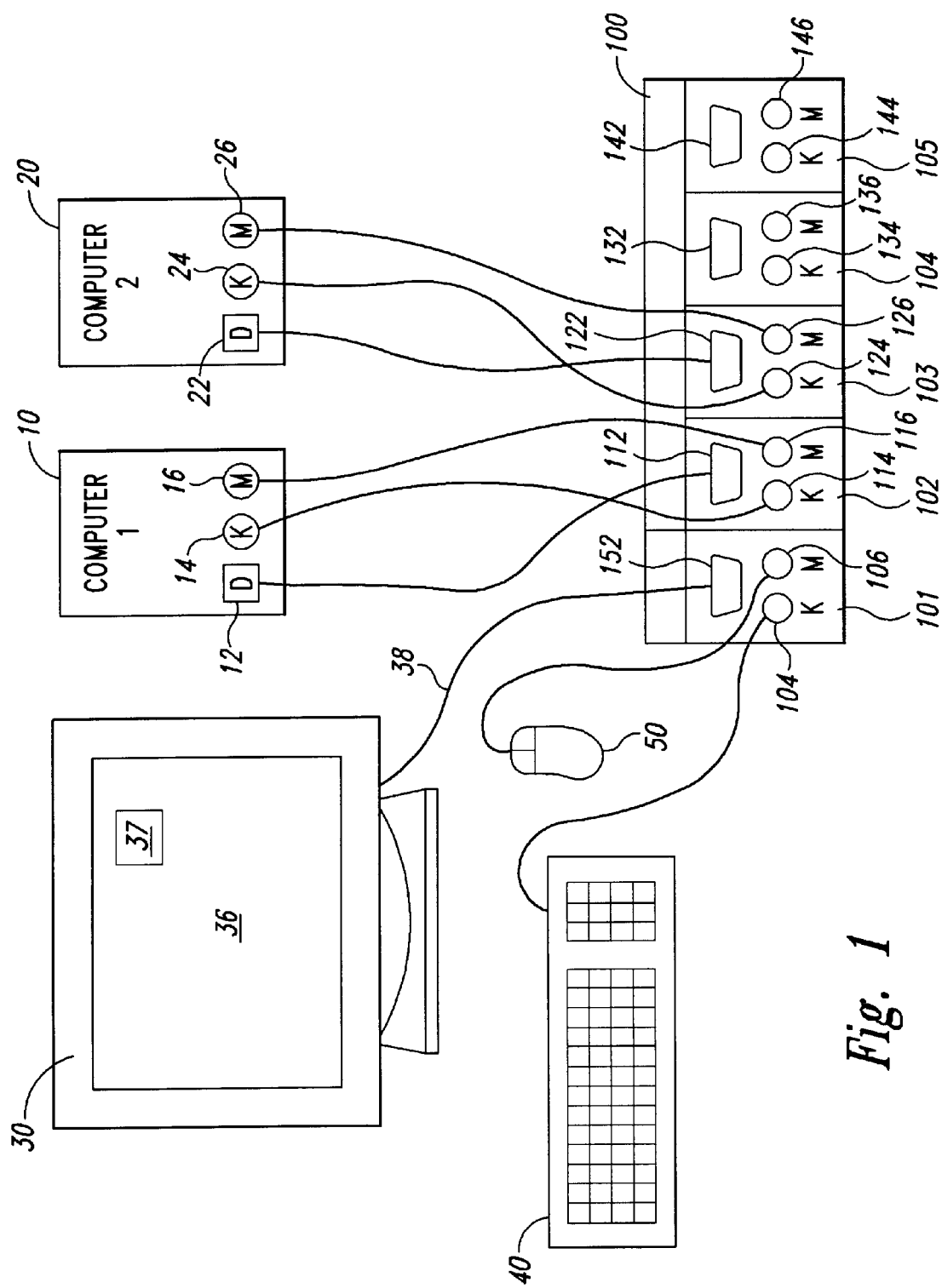
FIG. 1 is a schematic diagram of two computers connected to a switchbox according to a first embodiment of the present invention.

FIG. 1 illustrates two computers 10, 20 connected to a single monitor 30 by a switchbox 100 according to one embodiment of the present invention. Each computer 10,20 includes a display output 12,22, a keyboard input 14,24 and a mouse input 16,26, respectively. The switchbox 100 has a plurality of sets of ports 102–105 (four being shown in FIG. 1), each set having a respective video input port 112, 122, 132, 142, a respective mouse output port 116, 126, 136, 146 and a respective keyboard output port 114, 124, 134, 144. Switchbox 100 also has another set of ports 101 which include a video output port 152, a keyboard input port 104, and a mouse input port 106. The display outputs 12,22 and the keyboard and mouse inputs 14,24, 16,26 of the two computers are connected to corresponding display inputs 112, 122 and keyboard and mouse outputs 114, 124, 116, 126 of the switchbox 100. The input 38 of a single monitor 30 is connected to the display output 152 of the switchbox 100. Likewise a keyboard 40 and mouse 50 are connected to corresponding keyboard and mouse inputs 104, 106 of the port set 101 of the switchbox 100.

As shown in FIG. 1, monitor 30 has a main display area 36 and a PIP area 37. The relative sizes of these areas can be adjusted as is well known in the art and the information displayed in these areas can be toggled back and forth as described in greater detail below.

Figure 2:
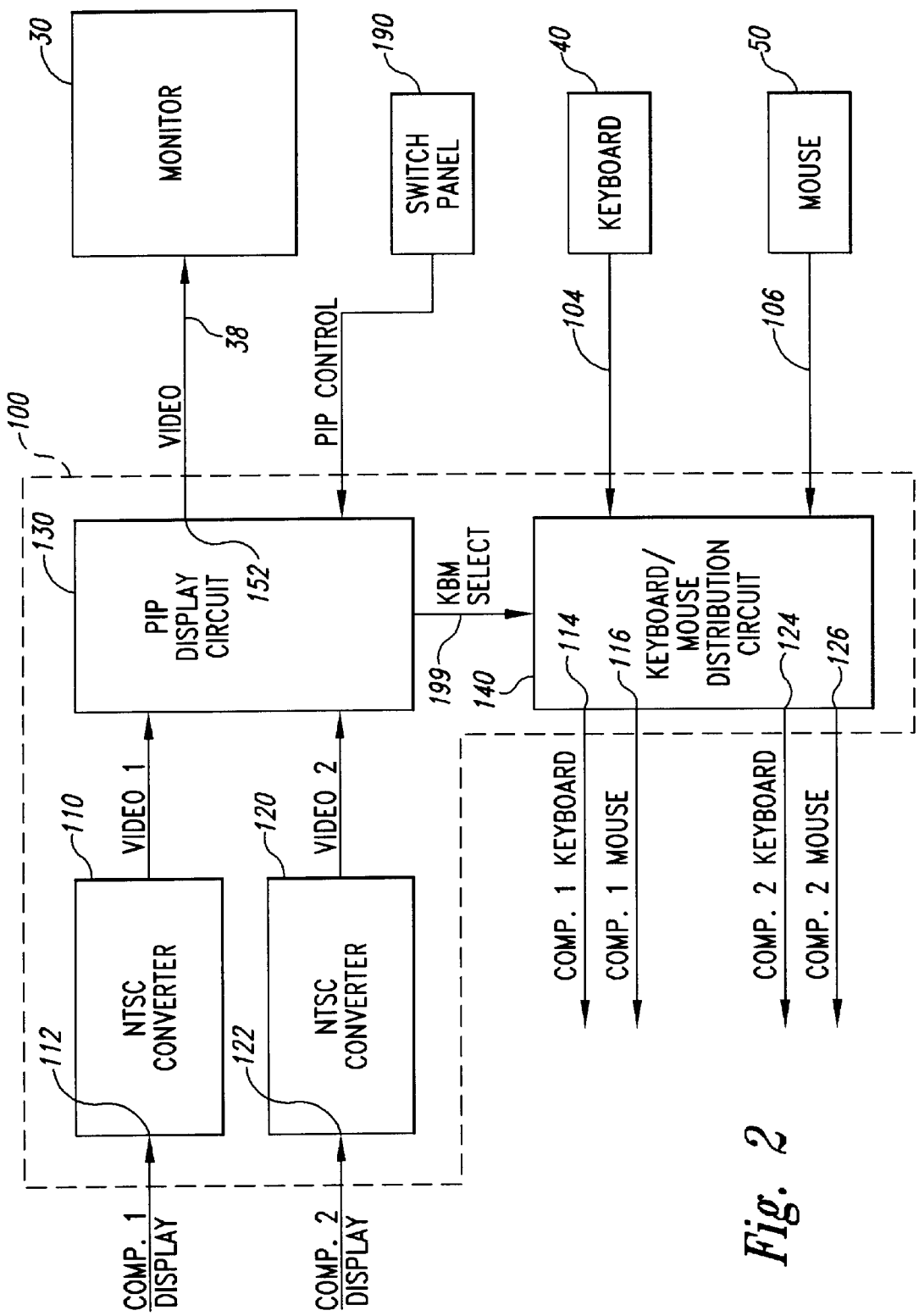
FIG. 2 is a block diagram of a first embodiment of the switchbox of FIG. 1.

A more detailed description of the switchbox 100 will now be presented with reference to FIG. 2. The switchbox 100 comprises a respective NTSC converter 110) 120 for each port set 102–105 (as shown in FIG. 1). Although only two NTSC converters 110, 120 are shown in FIG. 2, it should be understood that one NTSC converter will be provided for each of the video ports of the port sets 102–105 of switchbox 100 (four are shown in FIG. 1). The NTSC converters 110, 120 convert video display signals from the computers 10, 20 to NTSC video format. Such converters are well known in the art and will not be described in further detail herein.

The NTSC video output of each of the converters 110, 120 are input to a PIP display circuit 130. Because of the conversion of the computer video data to NTSC format by the converters 110, 120, it is possible to use a PIP display circuit 130 found in an ordinary PIP television receiver. An example of such a PIP display circuit is described in U.S. Pat. No. 5,285,284, the contents of which are incorporated by reference herein. Such PIP display circuits are well known in the art and therefore will not be described in further detail herein. The output video signal (the signal comprising the combined main screen video and PIP video, if any) from the PIP display circuit is output to a monitor 30.

The switchbox 100 also includes a keyboard/mouse distribution circuit 140. This circuit 140 performs the function of switching the keyboard and mouse outputs to that one of the computers 10,20 which is providing a display on the main display area 36 of monitor 30. The circuit 140 also performs a second function. As is well known in the art, many personal computers require that a keyboard be connected when they turn on. Without a keyboard attached, many personal computers will declare an error and abort the boot-up procedure. Additionally, many personal computers will not recognize (will not accept inputs from) a mouse not connected thereto at start-up, and also will not recognize a mouse or keyboard that has been detached and then re-attached to the computer after start-up.

In order to address this problem in the present invention, which utilizes a single mouse and keyboard, the circuit 140 outputs "dummy" signals on both the keyboard 114, 124, 134, 144 and mouse 116, 126, 136, 146 connectors for each of the port sets 102–105 corresponding to a computer whose video is not displayed in the main screen area 36 while supplying the actual signals from the keyboard 40 and mouse 50 to the computer having an output displayed in the main screen area 36 of monitor 30. The dummy signals simply mimic the signals sent by an ordinary keyboard and mouse to a computer upon startup and in normal operation to signal their presence. The dummy signals do not, however, include any signals corresponding to a key press from a keyboard or movement by a mouse. In this manner, the dummy signals "trick" a computer into believing that a keyboard and mouse are attached.

A switch panel 190 is used to control the content of the main display area 36 and the PIP window 37 of the monitor 30 as further described below with respect to FIGS. 4 and 5. The panel 190 may be located on a surface of the switchbox 100 such as the front or top surface. Alternatively, the panel may be located on the monitor 30.

Figure 3:
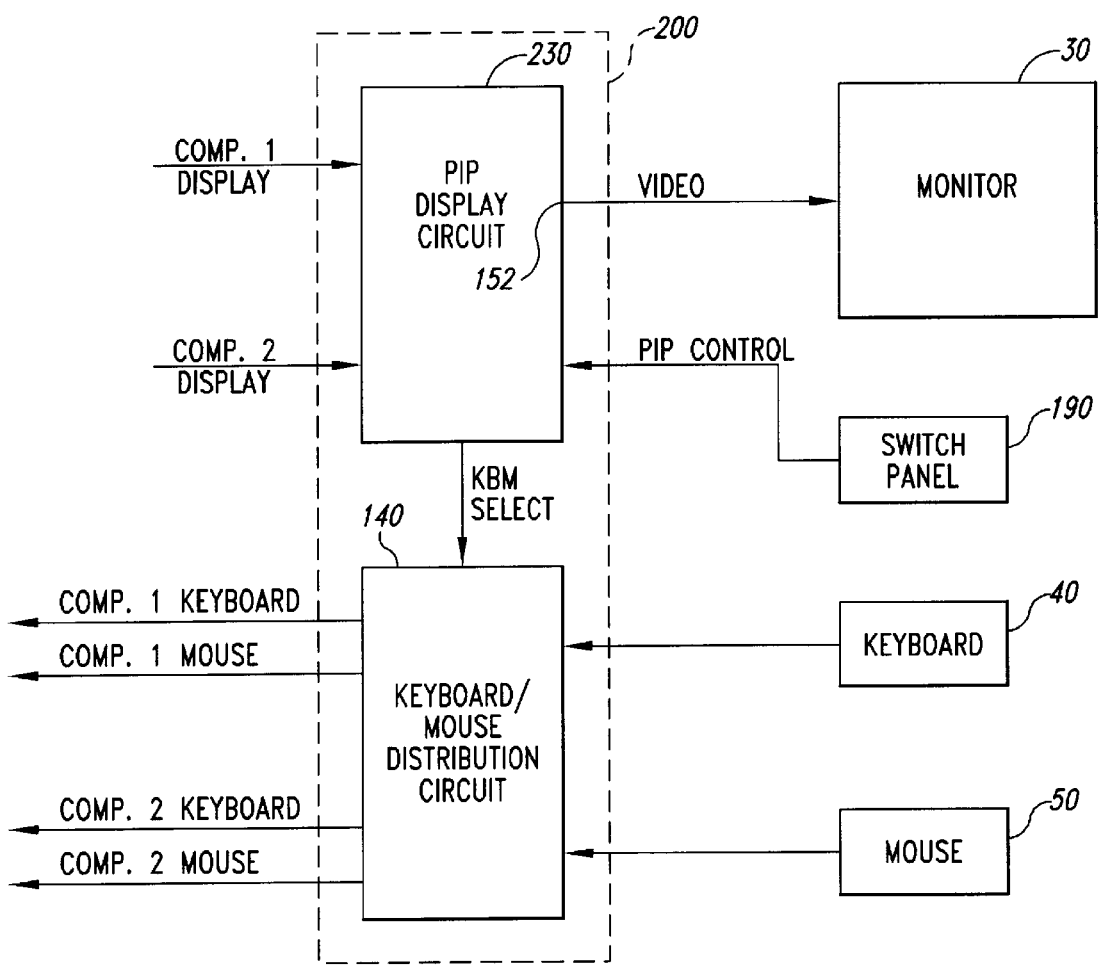
FIG. 3 is a block diagram of a second embodiment of the switchbox of FIG. 1.

As discussed above, the switchbox 100 converts the computer video signals to NTSC format (other formats, such as PAL, and others could also be used). This is done in the switchbox 100 of FIG. 2 in order to take advantage of existing implementations of PIP display circuits 130 designed for television sets. This approach has some drawbacks, however. Perhaps the most important drawback is the loss in resolution associated with converting computer video to the NTSC format. Accordingly, it may be desirable to modify the PIP display circuit 130 to accept computer video. As used herein, computer video refers to display information in analog form rather than digital form. In another embodiment, PIP receivers are modified to accept computer video inputs. A switchbox 200 with a PIP display circuit 230 that accepts computer video data is shown in FIG. 3. Computer video is supplied with differing vertical and horizontal frequencies, includes separate RGB (red, green, blue) signals rather than phase-encoded color information, and is usually non-interlaced rather than interlaced. These differences, as well as the modifications necessary to adapt a PIP display circuit for use with computer video, are well known in the art. The switchbox 200 of FIG. 3 operates substantially similar to that of the switchbox 100 of FIG. 2 except the PIP display circuit 230 accepts computer video inputs.

Figure 4:
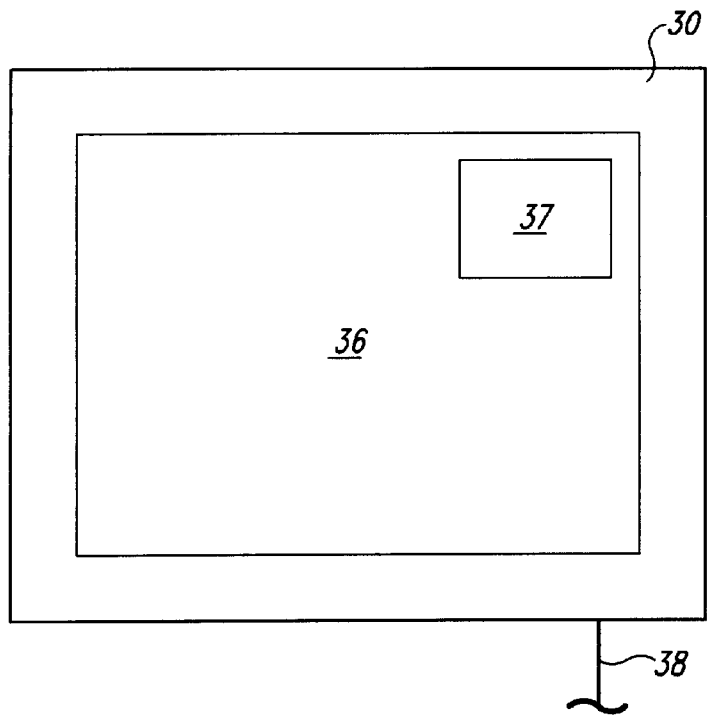
FIG. 4 is a block diagram of a display including a PIP window.
Figure 5:
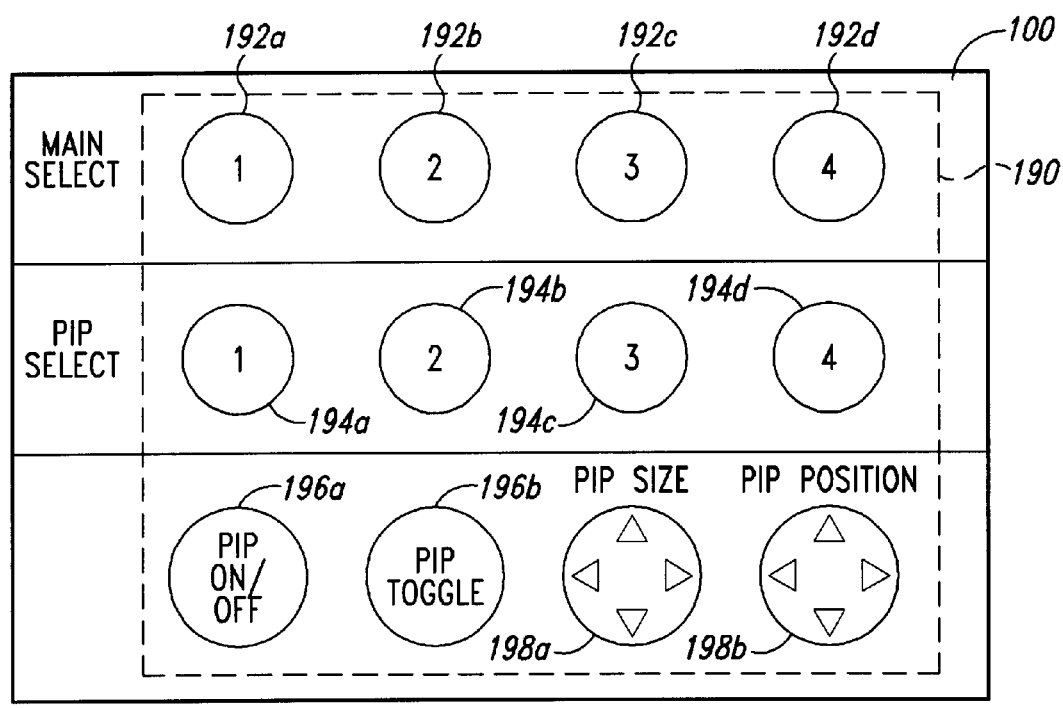
FIG. 5 is a schematic diagram of the switches employed in the switchbox of FIG. 1.

Referring now to FIGS. 4 and 5, the operation of the switchbox 100 in response to user input will now be discussed. FIG. 4 illustrates a monitor 30 having both a main display area 36 and a PIP window 37. FIG. 5 illustrates switch panel 190 with a plurality of buttons 192a–d, 194a–d, 196a, b for controlling the content of the main display area 36 and the PIP window 37. The buttons 192a–d select the computer whose video will be displayed in the main display area 36. The buttons 194a–d select the computer whose video will be displayed in the PIP window 37. The button 196a turns on and off the display of the PIP window 37. Finally, the button 196b toggles the contents of the PIP window 37 and the main display area 36.

The PIP display circuit 130 also outputs a KBM select signal 199 to the distribution circuit 140. The KBM select signal simply informs the distribution circuit 140 as to which computer input (e.g. 1–4) is currently displayed in the main area based on which button 192a–d is selected. As discussed above, the distribution circuit 140 supplies the actual keyboard 40 and mouse 50 signals to the computer whose video is currently displayed in the main area and supplies dummy signals to all other connected computers.

In addition to the buttons described above, the switchbox 100 may include additional buttons and features, such as for example buttons 198a, b, that allow the PIP window to be moved and/or resized. Such features are available commercially in television sets today and are well known in the art.

Figure 6:
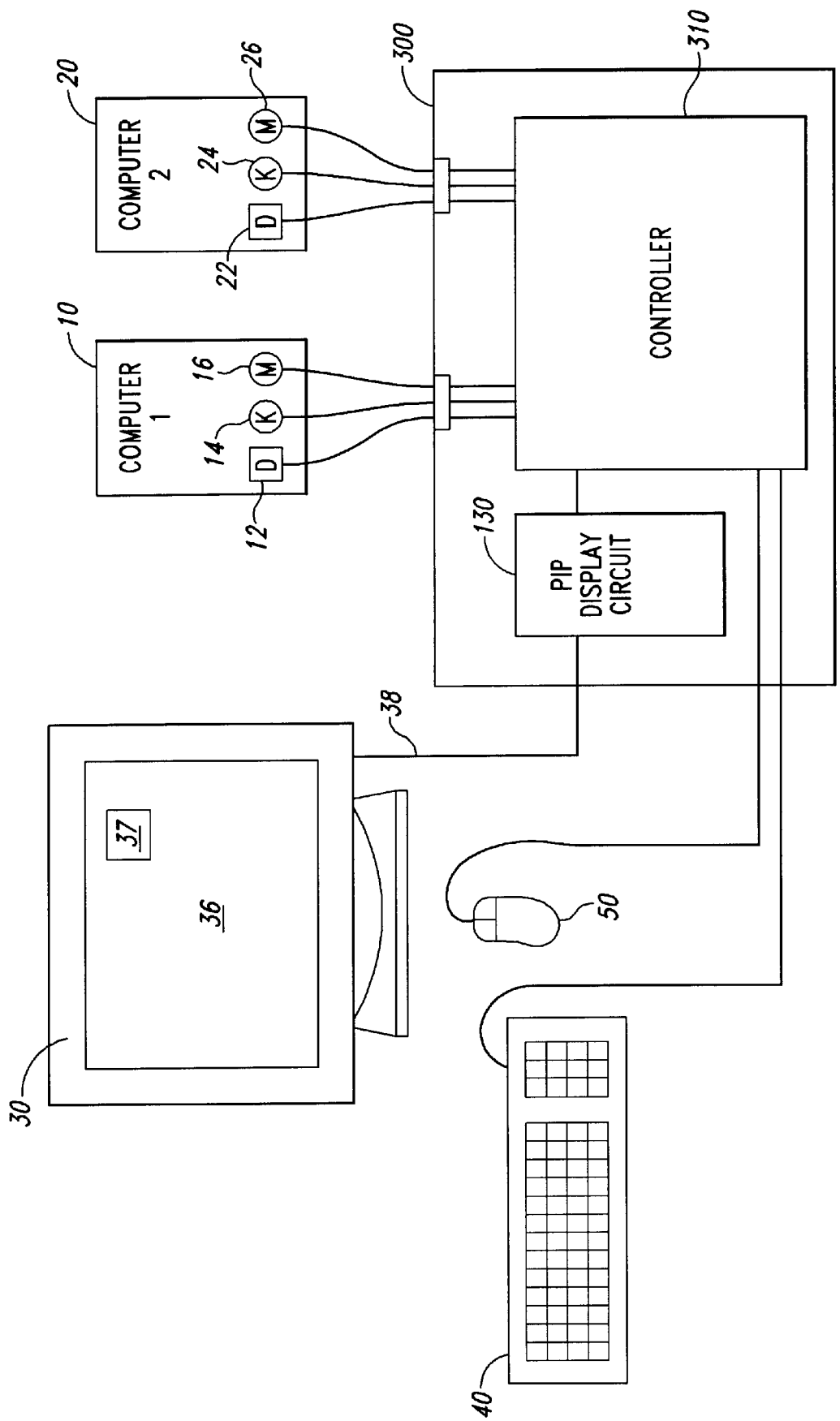
FIG. 6 is a schematic diagram of two computers connected to a switchbox according to a second embodiment of the present invention.

FIG. 6 is a schematic diagram of two computers 10, 20 connected to a switchbox 300 according to a second embodiment of the present invention. Each computer 10, 20 includes a display output 12, 22, a keyboard input 14, 24 and a mouse input 16, 26, respectively. The display outputs 12, 22 and the keyboard and mouse inputs 14, 24, 16, 26 of the two computers are connected to a controller 310, such as a CPU, of switchbox 300. Controller 310 may include a microprocessor. The microprocessor may by any conventional general purpose single- or multi-chip microprocessor. In addition, the microprocessor may be any conventional special purpose microprocessor such as a digital signal processor or a graphics processor. The input 38 of a single monitor 30 is connected to a PIP display circuit 130 which is connected to controller 310 of switchbox 300. Likewise a keyboard 40 and mouse 50 are connected to corresponding keyboard and mouse inputs of the controller 310 of the switchbox 300.

As shown in FIG. 6, monitor 30 has a main display area 36 and a PIP area 37. In accordance with the present invention, the information displayed can be toggled back and forth between computer 10 and computer 20, i.e., the main display area 36 can display the output of computer 10 and the PIP window 37 can display the output of computer 20, or the main display area 36 and PIP window 37 can be toggled so that the main display area 36 displays the output from computer 20 and the PIP window 37 displays the output from computer 10, as described below.

Figure 7A:
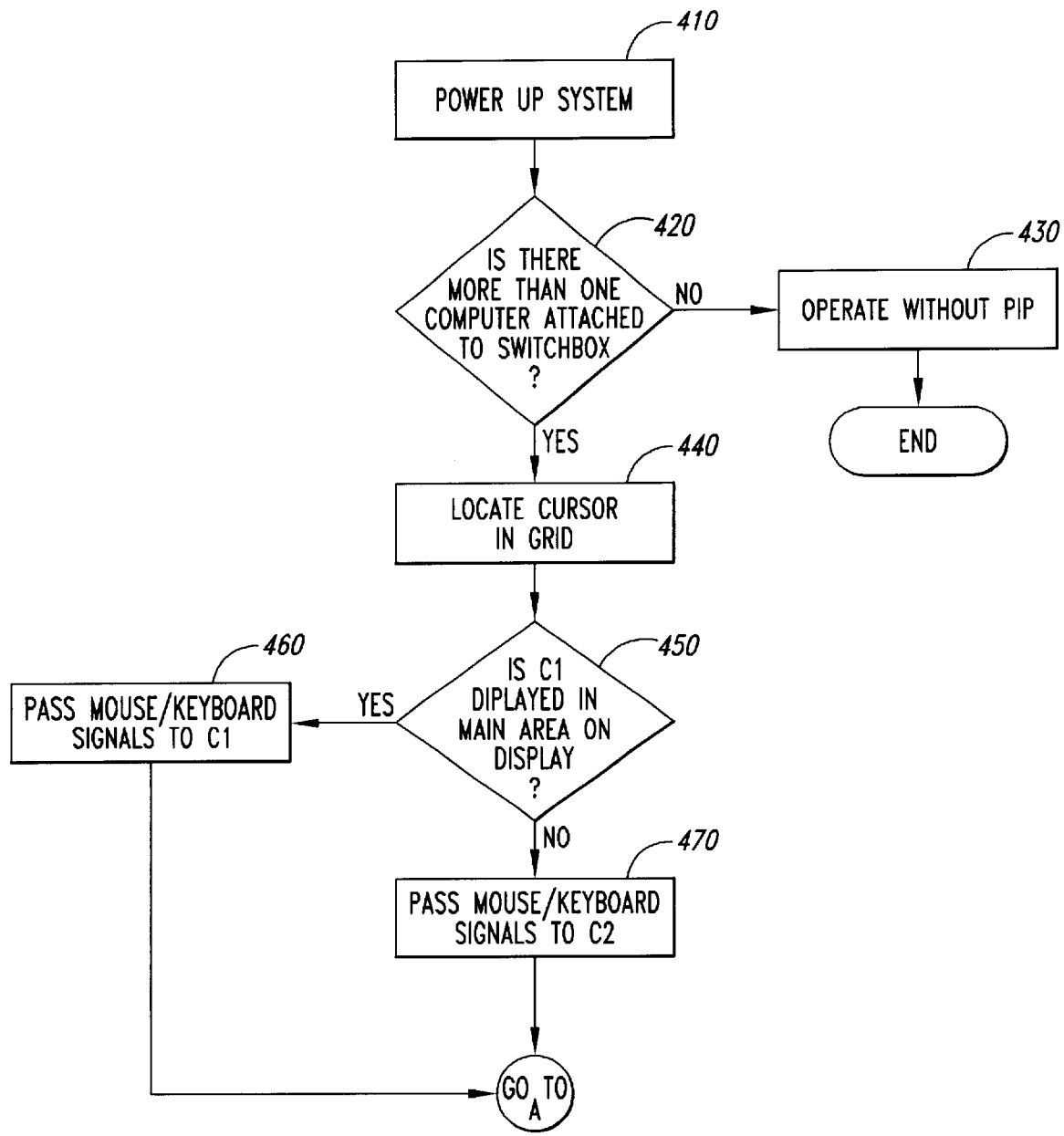
FIGS. 7A and 7B illustrate in flow chart form the operation of the switchbox of FIG. 6.
Figure 7B:
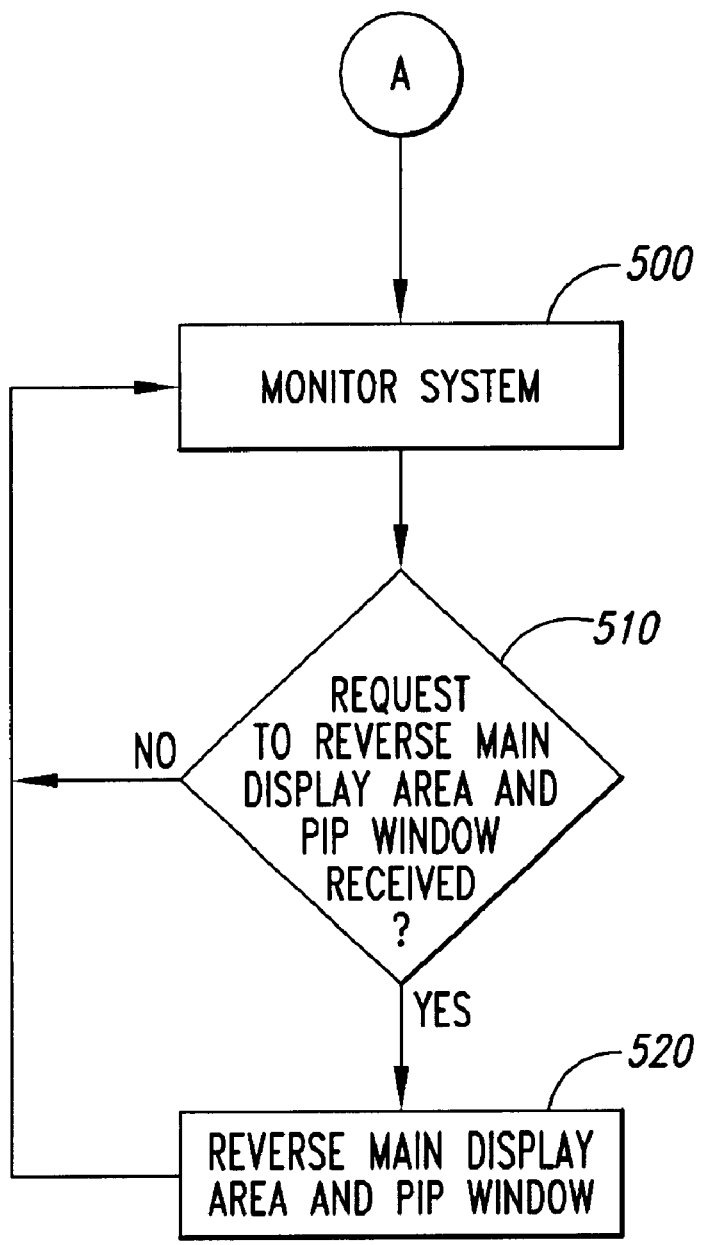

A more detailed description of the operation of switchbox 300 in accordance with the present invention will now be described with respect to the flow charts as illustrated in FIGS. 7A and 7B. Specifically, FIG. 7A illustrates the initialization process for the PIP operation of the system according to the present invention. As shown in FIG. 7A, at 410, the system including computers 10, 20, switchbox 300 and monitor 30, is powered up. At 420, controller 310 of switchbox 300 determines if there is more than one computer attached to switchbox 300 based on initialization routines performed by computers 10, 20 and controller 310. If there is not more than one computer connected to switchbox 300, thus making PIP operation unnecessary, at 430 controller 310 will proceed with operation of the system without the PIP fiction, and the PIP initialization procedure ends.

If there is more than one computer connected to switchbox 300, requiring use of the PIP function, at 440 controller 310 will locate the cursor within the grid on which main display area 36 and PIP window 37 are imposed to configure the system for operation. As is known in the art, monitor displays, such as the display of monitor 30, are based on a coordinate grid system which enables the system to position the cursor based on the movement of a user input device such as, for example, mouse 50. At 450, controller 310 determines if the output from computer 10 (Computer 1) is being displayed in the main display area 36 of monitor 30 based on signals from PIP display circuit 130. If the output from computer 10 is being displayed in the main display area 36 of monitor 30, at 460 controller 310 passes the mouse and keyboard signals from mouse 50 and keyboard 40, respectively, to computer 10 for control. If the output from computer 10 is not being displayed in the main display area 36 of monitor 30, i.e., the output from computer 20 is being displayed in the main display area 36 of monitor 30, at 470 controller 310 passes the mouse and keyboard signals from mouse 50 and keyboard 40, respectively, to computer 20 for control. Controller 310 will additionally output "dummy" signals to the computer whose video is not displayed in the main screen area 36 similarly as described with respect to FIG. 2.

Referring now to FIG. 7B, after the initialization procedure has completed and the PIP function is operating, at 500 controller 310 monitors the system to determine if the system user desires to toggle the main display area 36 and PIP window 37 of monitor 30. At 510, it is determined if a request to reverse the main display area 36 and PIP window 37 has been received from the user, such as for example by a control click on mouse 50 with the cursor placed on the PIP window 37. Controller 310 knows the location of the PIP window 37 on monitor 30 based on a unique identifier for the PIP window 37 in the grid of the display of monitor 30. Thus, when the user desires to reverse the main display area 36 and the PIP window 37, the cursor is positioned over the PIP window 37 by manipulation of the mouse 50 and a control click, such as for example a double click, will signal the controller 310 and PIP display circuit 130 to reverse the main display area 36 and PIP window 37 at 520 of FIG. 7B. Alternatively, if monitor 30 is a touch screen, touching the PIP window 37 can signal the controller 310 and PIP display circuit 130 to reverse the main display area 36 and PIP window 37. When the main display area 36 and PIP window 37 are toggled, the controller 310 will store the configuration data for that computer 10,20 whose output is currently being displayed in main display area 36 for use should the system toggle the main display area 36 and PIP window 37 again. Controller 310 continues to monitor the system to determine if a request to reverse the main display area 36 and PIP window 37 is again received.

Additionally, controller 310 can allow for the PIP window 37 to be moved and/or resized. For example, the PIP window 37 can be resized and/or moved by clicking the cursor on and dragging a border of the PIP window 37 as is known in the art.

It is important to know that while only two computers 10,20 have been illustrated and described with respect to the present invention, the invention is not so limited and any number of computers may be used simultaneously with a corresponding number of PIP windows 37. Thus, in accordance with the present invention, the output of at least two computers can be simultaneously displayed in a picture-in-picture format on a single monitor.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. An apparatus for displaying computer display information from at least two computers on a single monitor in a picture-in-picture format comprising:
   a plurality of inputs for receiving computer display information from a plurality of computers;
   a picture-in-picture circuit connectable to a monitor and connected to the inputs for outputting a display signal to the monitor in a picture-in-picture format with a main area and a picture-in-picture window; and
   a signal provider connected to the picture-in-picture circuit and connectable to an input device, the signal provider being adapted to supply signals from the input device to a first computer whose display information is displayed in the main area and to supply dummy signals to a second computer whose display information is displayed in the picture-in-picture window.

2. The apparatus of claim 1, wherein the computer display information comprises computer video.

3. The apparatus of claim 1, wherein the inputs convert computer display information from computer video format to NTSC format.

4. The apparatus of claim 1, wherein the inputs convert computer display information from computer video format to PAL format.

5. The apparatus of claim 1 wherein the signal provider comprises a distribution circuit, the distribution circuit supplying dummy signals to each of the plurality of computers connected to the apparatus other than the first computer.

6. The apparatus of claim 1 wherein the signal provider comprises a controller supplying dummy signals to each of the plurality of computers connected to the apparatus other than the first computer.

7. The apparatus of claim 6, wherein said controller includes a processor.

8. The apparatus of claim 1, wherein the input device is a mouse.

9. The apparatus of claim 1, wherein the input device is a keyboard.

10. A method for displaying computer display information from at least two computers on a single monitor in picture-in-picture format, the method comprising the acts of:
    receiving first display information from a first computer;
    receiving second display information from a second computer;
    displaying the first display information in a main screen area of the monitor; and
    displaying the second display information in a picture-in-picture area of the monitor;

supplying input-device signals to the first computer; and supplying dummy input-device signals to the second computer.

11. The method of claim 10, wherein the acts of receiving first and second display information include receiving first and second digital display information.

12. The method of claim 10, wherein the acts of receiving first and second display information includes receiving first and second computer video.

13. The method of claim 12, further comprising:

converting the computer video from the first and second computer to a different format.

14. The method of claim 13, wherein the act of converting includes converting the computer video to NTSC format.

15. The method of claim 13, wherein the act of converting includes converting the computer video to PAL format.

16. The method of claim 10, further comprising switching the contents of the main screen area and the picture-in-picture area in response to a toggle signal.

17. The method of claim 10, further comprising repositioning the picture-in-picture area in response to a reposition signal.

18. The method of claim 10, further comprising resizing the picture-in-picture area in response to a resize signal.

19. The method of claim 10, further comprising switching the displays to display the first display information in the picture-in-picture area and display the second display information in the main screen area.

20. A computer system comprising:

a first computer;

a second computer;

an input device;

a monitor; and an apparatus connected to the first computer, the second computer, the input device and the monitor;

wherein the apparatus is operable to supply input signals from the input device to the first computer while causing information from the first computer to be displayed in a main screen area of the monitor and to supply dummy input signals to the second computer while causing information from the second computer to be displayed in a picture-in-picture area of the monitor.

21. The computer system of claim 20, wherein the first computer and the second computer are connected to transmit computer video to the apparatus.

22. The computer system of claim 20, wherein the input device is a mouse.

23. The computer system of claim 20, wherein the input device is a keyboard.

24. The computer system of claim 20, wherein the monitor is a touch screen monitor.

25. The computer system of claim 20, wherein the apparatus includes a distribution circuit connected to the input device, the distribution circuit supplying the input signals from the input device to the computer corresponding to the information displayed in the main display area and transmits the dummy input signals to the computer corresponding to the information displayed in the picture-in-picture area.

26. The computer system of claim 20, wherein the apparatus includes a controller connected to the input device, the controller supplying the input signals from the input device to the computer corresponding to the information displayed in the main display area and transmits the dummy input signals to the computer corresponding to the information displayed in the picture-in-picture area.

27. The computer system of claim 26, wherein the controller includes a processor.

28. An apparatus for displaying computer display information from a first computer and a second computer on a single monitor in a picture-in-picture format comprising:

a first set of ports including a first display input adapted to receive first display information from the first computer and a first input device output port adapted to deliver input signals to the first computer;

a second set of ports including a second display input adapted to receive second display information from the second computer and a second input device output port adapted to deliver input signals to the second computer;

a third set of ports including a display output adapted to output a composite display signal to a monitor and an input device input port adapted to receive input signals from an input device;

a picture-in-picture circuit connected to the display output and adapted to generate the composite display signal wherein display information from the first and second display inputs is arranged in a picture-in-picture format with one of the first display information and the second display information displayed in a main area and the other of the first display information and the second display information displayed in a picture-in-picture window; and a signal provider connected to the input device input port and the first and second input device output ports, the signal provider being adapted to supply the input signals from the input device to the first input device output port and supply dummy input signals to the second input device output port when the first display information is displayed in the main area, and to supply the input signals from the input device to the second input device output port and supply dummy input signals to the first input device output port when the second display information is displayed in the main area.

29. The apparatus of claim 28, further comprising a fourth set of ports including a third display input adapted to receive first display information from a third computer and a third input device output port adapted to deliver input signals to the first computer.

30. The apparatus of claim 29 wherein the signal provider is adapted to supply dummy input signals to the third input device output port when the first display information and the second display information is displayed in the main area.

31. The apparatus of claim 29 wherein the picture-in-picture circuit is connected to the first, second, and third display inputs.

32. The apparatus of claim 29 wherein the composite display signal includes display information from the first, second, and third display inputs arranged in a picture-in-picture format with one of the first display information, the second display information, and the third display information displayed in a main area and each of the other two of the first display information, the second display information, and the third display information displayed in a separate picture-in-picture window.

33. A computer system comprising:

a first computer;

a second computer;

an input device;

a single monitor; and an apparatus connected to the first computer, the second computer, the input device and the single monitor, the apparatus including:

a display output connected to the monitor;

an input device input port connected to the input device;

a first display input adapted to receive first display information from the first computer;

a first input device output port adapted to deliver input signals to the first computer;

a second display input adapted to receive second display information from the second computer;

a second input device output port adapted to deliver input signals to the second computer;

a picture-in-picture circuit connected to the display output and adapted to supply to the display output a composite display signal wherein display information from the first and second display inputs is arranged in a picture-in-picture format with one of the first display information and the second display information displayed in a main area and the other of the first display information and the second display information displayed in a picture-in-picture window; and a signal provider connected to the input device input port and the first and second input device output ports, the signal provider being adapted to supply the input signals from the input device to the first input device output port and supply dummy input signals to the second input device output port when the first display information is displayed in the main area, and to supply the input signals from the input device to the second input device output port and supply dummy input signals to the first input device output port when the second display information is displayed in the main area.

34. An apparatus for displaying computer display information from at least two computers on a single monitor in a picture-in-picture format comprising:

a plurality of inputs for receiving computer display information from a plurality of computers;

a picture-in-picture means connectable to a monitor and connected to the inputs for outputting a display signal to the monitor in a picture-in-picture format with a main area and a picture-in-picture window; and a signal means for supplying input-device signals from an input device to a first computer whose display information is displayed in the main area and to supply dummy input-device signals to a second computer whose display information is displayed in the picture-in-picture window.

* * * * *

UNITED STATES PATENT AND TRADEMARK OFFICE
CERTIFICATE OF CORRECTION

PATENT NO. : 6,373,500 B1
DATED : April 16, 2002
INVENTOR(S) : Daniels

It is certified that error appears in the above-identified patent and that said Letters Patent is hereby corrected as shown below:

<u>Column 2,</u>
Line 54, "110) 120" should be -- 110, 120 --;

<u>Column 5,</u>
Line 6, "fiction" should be -- function --;

Signed and Sealed this

Eleventh Day of March, 2003

JAMES E. ROGAN
*Director of the United States Patent and Trademark Office*